United States Patent [19]
Dang et al.

[11] Patent Number: 6,136,057
[45] Date of Patent: Oct. 24, 2000

[54] VENTILATION AND FILTERING SYSTEM FOR VEHICLES

[76] Inventors: Anthony Dang, 264 E. Cottage St. #1, Boston, Mass. 02125; Loretta Redfurn, 600 E. Pollock Rd. #2301, State College, Pa. 16801

[21] Appl. No.: 09/267,012

[22] Filed: Mar. 11, 1999

[51] Int. Cl.[7] .................................................. B01D 35/147
[52] U.S. Cl. .............................. 55/385.3; 55/473; 55/481; 96/223; 96/418; 96/134
[58] Field of Search ..................... 55/385.3, 473, 55/481, 419, 467; 96/418, 417, FOR 175, 223, 134

[56] References Cited

U.S. PATENT DOCUMENTS

| | | | |
|---|---|---|---|
| 3,444,700 | 5/1969 | Beyer | 55/385.3 |
| 4,604,111 | 8/1986 | Natale | 55/419 |
| 4,689,060 | 8/1987 | Koske | 55/385.3 |
| 5,147,430 | 9/1992 | Kidd | 55/385.3 |
| 5,433,772 | 7/1995 | Sikora | 55/385.3 |
| 5,494,497 | 2/1996 | Lee | 55/385.3 |
| 5,501,716 | 3/1996 | Chiba et al. | 55/385.3 |
| 5,762,665 | 6/1998 | Abrahamian et al. | 55/385.3 |
| 5,968,214 | 10/1999 | Nagata et al. | 55/385.3 |

*Primary Examiner*—Duane S. Smith
*Assistant Examiner*—Minh-Chau T. Pham

[57] ABSTRACT

A ventilation and filtering system for vehicles for filtering and circulating air through a vehicle. The ventilation and filtering system for vehicles includes an inlet tube having an outer end in communication with air outside a vehicle, an inner end positioned in a passenger compartment of the vehicle, and an intake fan for blowing air through the inlet tube into the passenger compartment of the vehicle. An exhaust tube has a first end positioned in a passenger compartment of the vehicle, a second end in communication with air outside the vehicle, and an exhaust fan for blowing air through the exhaust tube out of the passenger compartment of the vehicle.

7 Claims, 2 Drawing Sheets

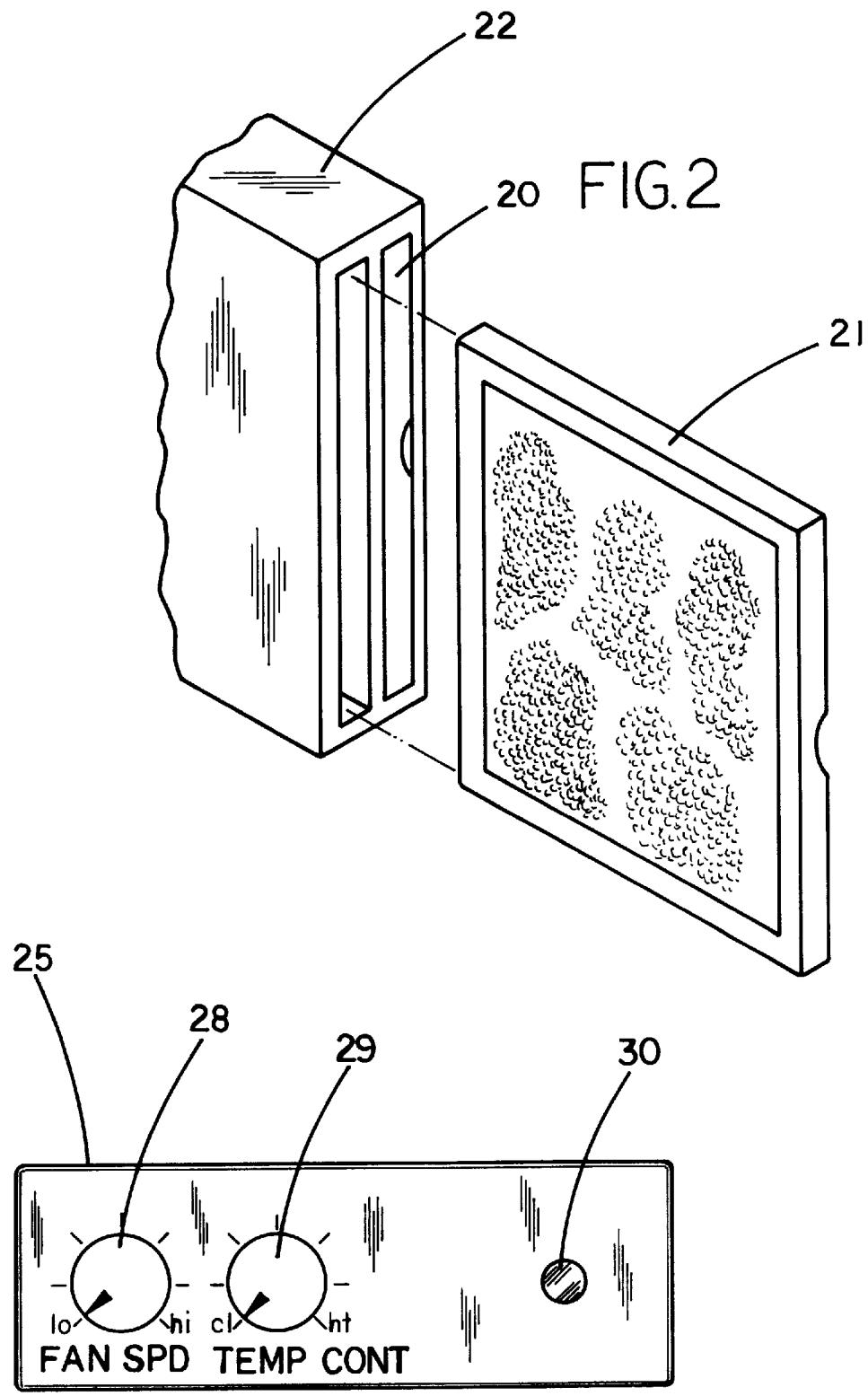

VENTILATION AND FILTERING SYSTEM FOR VEHICLES

BACKGROUND OF THE INVENTION

1. Field of the Invention

The present invention relates to air filters blowers and more particularly pertains to a new ventilation and filtering system for vehicles for filtering and circulating air through a vehicle.

2. Description of the Prior Art

The use of air filters blowers is known in the prior art. More specifically, air filters blowers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,702,753; U.S. Pat. No. 5,085,266; U.S. Pat. No. 2,835,183; U.S. Pat. No. 5,683,478; U.S. Pat. No. 3,552,103; and U.S. Pat. No. 344,581.

While these devices fulfill their respective, particular objectives and requirements, the aforementioned patents do not disclose a new ventilation and filtering system for vehicles. The inventive device includes an inlet tube having an outer end in communication with air outside a vehicle, an inner end positioned in a passenger compartment of said vehicle, and an intake fan for blowing air through said inlet tube into said passenger compartment of said vehicle. An exhaust tube has a first end positioned in a passenger compartment of said vehicle, a second end in communication with air outside said vehicle, and an exhaust fan for blowing air through said exhaust tube out of said passenger compartment of said vehicle.

In these respects, the ventilation and filtering system for vehicles according to the present invention substantially departs from the conventional concepts and designs of the prior art, and in so doing provides an apparatus primarily developed for the purpose of filtering and circulating air through a vehicle.

SUMMARY OF THE INVENTION

In view of the foregoing disadvantages inherent in the known types of air filters blowers now present in the prior art, the present invention provides a new ventilation and filtering system for vehicles construction wherein the same can be utilized for filtering and circulating air through a vehicle.

The general purpose of the present invention, which will be described subsequently in greater detail, is to provide a new ventilation and filtering system for vehicles apparatus and method which has many of the advantages of the air filters blowers mentioned heretofore and many novel features that result in a new ventilation and filtering system for vehicles which is not anticipated, rendered obvious, suggested, or even implied by any of the prior art air filters blowers, either alone or in any combination thereof.

To attain this, the present invention generally comprises an inlet tube having an outer end in communication with air outside a vehicle, an inner end positioned in a passenger compartment of said vehicle, and an intake fan for blowing air through said inlet tube into said passenger compartment of said vehicle. An exhaust tube has a first end positioned in a passenger compartment of said vehicle, a second end in communication with air outside said vehicle, and an exhaust fan for blowing air through said exhaust tube out of said passenger compartment of said vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new ventilation and filtering system for vehicles apparatus and method which has many of the advantages of the air filters blowers mentioned heretofore and many novel features that result in a new ventilation and filtering system for vehicles which is not anticipated, rendered obvious, suggested, or even implied by any of the prior art air filters blowers, either alone or in any combination thereof.

It is another object of the present invention to provide a new ventilation and filtering system for vehicles which may be easily and efficiently manufactured and marketed.

It is a further object of the present invention to provide a new ventilation and filtering system for vehicles which is of a durable and reliable construction.

An even further object of the present invention is to provide a new ventilation and filtering system for vehicles which is susceptible of a low cost of manufacture with regard to both materials and labor, and which accordingly is then susceptible of low prices of sale to the consuming public, thereby making such ventilation and filtering system for vehicles economically available to the buying public.

Still yet another object of the present invention is to provide a new ventilation and filtering system for vehicles which provides in the apparatuses and methods of the prior art some of the advantages thereof, while simultaneously overcoming some of the disadvantages normally associated therewith.

Still another object of the present invention is to provide a new ventilation and filtering system for vehicles for filtering and circulating air through a vehicle.

Yet another object of the present invention is to provide a new ventilation and filtering system for vehicles which includes an inlet tube having an outer end in communication with air outside a vehicle, an inner end positioned in a passenger compartment of said vehicle, and an intake fan for blowing air through said inlet tube into said passenger compartment of said vehicle. An exhaust tube has a first end positioned in a passenger compartment of said vehicle, a second end in communication with air outside said vehicle, and an exhaust fan for blowing air through said exhaust tube out of said passenger compartment of said vehicle.

Still yet another object of the present invention is to provide a new ventilation and filtering system for vehicles that promotes healthier breathing for non-smokers and people suffering from asthma and bronchitis.

Even still another object of the present invention is to provide a new ventilation and filtering system for vehicles that allows people to receive fresh air ventilation without opening windows during snow, rain, cold weather, or hot weather. The heater core and air conditioning core are positioned inline in the inlet tube to warm or cool the fresh air before it reaches the passenger compartment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic perspective view of the filter of the present invention.

FIG. 3 is a schematic side view of the control panel of the present invention.

DESCRIPTION OF THE PREFERRED EMBODIMENT

Figure 1:
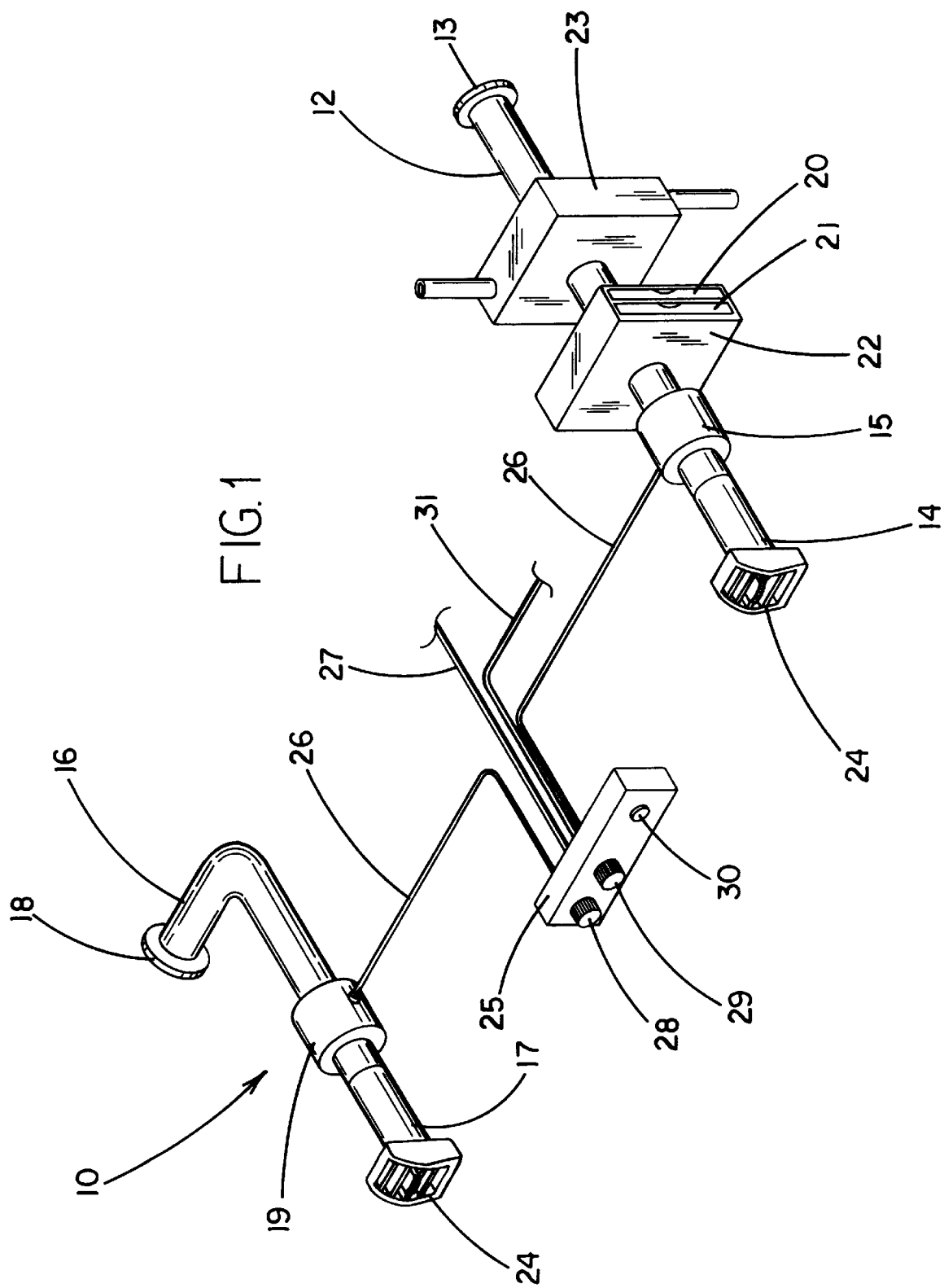
FIG. 1 is a schematic perspective view of a new ventilation and filtering system for vehicles according to the present invention.

With reference now to the drawings, and in particular to FIGS. 1 through 3 thereof, a new ventilation and filtering system for vehicles embodying the principles and concepts of the present invention and generally designated by the reference numeral 10 will be described.

As best illustrated in FIGS. 1 through 3, the ventilation and filtering system for vehicles 10 generally comprises an inlet tube 12 having an outer end 13 in communication with air outside a vehicle, an inner end 14 positioned in a passenger compartment of said vehicle, and an intake fan 15 for blowing air through said inlet tube into said passenger compartment of said vehicle. An exhaust tube 16 has a first end 17 positioned in a passenger compartment of said vehicle, a second end 18 in communication with air outside said vehicle, and an exhaust fan 19 for blowing air through said exhaust tube out of said passenger compartment of said vehicle.

Preferably, the inlet tube has a high efficiency particle arresting (HEPA) filter 20 for removing airborne debris and particles. Ideally, the HEPA filter will capture airborne particles of 0.3 microns and above. Optionally, the inlet tube may also have a charcoal filter 21 for removing noxious gases and exhaust from the air. Both filters would be removably housed in a filter housing 22 with the charcoal filter positioned between the inner end of the inlet tube and the HEPA filter since it is easier to clean than the charcoal filter.

Also preferably, the inlet tube has a heat exchanger 23 in communication with heating and cooling systems of the vehicle. The heat exchanger heats and cools the fresh air passing through the inlet tube.

Preferably, the inner end of the inlet tube has a directional vent 24 for directing airflow in a desired direction. The directional vent may include pivotable louvers. The first end of the exhaust tube could also have a directional vent.

Preferably, a control panel 25 is in electrical communication with the inlet and exhaust fans and a power source by means of fan wires 26 and power wires 27. The control panel has one or more first controllers 28 for controlling speeds of the fans. Ideally, the control panel has a second controller 29 in communication with the heating and cooling systems of the vehicle via wires 31 for adjusting the amount of heat the heat exchanger adds or removes from the fresh air passing through the inlet tube. Optionally, the control panel has an indicator light 30 for indicating when the filters are about to require replacement.

In use, air enters the inlet tube where its temperature is altered by the heat exchanger. The air is filtered by the HEPA filter where most or all of the allergans are removed. The air is filtered by the charcoal filter where most or all of the gaseous pollutants are removed. The healthy, filtered air is emitted into the passenger compartment of the vehicle. Air in the passenger compartment is blown out through the exhaust tube, thereby removing any allergens or pollutants that might be in the vehicle, as well as removing the exhalations from the passengers.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A ventilation and filtering system for vehicles for filtering and circulating air through a vehicle, the system comprising:

an inlet tube having an outer end in communication with air outside a vehicle, an inner end positioned in a passenger compartment of said vehicle, and an intake fan for blowing air through said inlet tube into said passenger compartment of said vehicle;

an exhaust tube having a first end positioned in a passenger compartment of said vehicle, a second end in communication with air outside said vehicle, and an exhaust fan for blowing air through said exhaust tube out of said passenger compartment of said vehicle; and a high efficiency particle arresting filter mounted on said inlet tube for removing airborne debris and particles from air moving through said inlet tube, a charcoal filter mounted on said inlet tube being for removing noxious passes and exhaust from the air moving through said inlet tube, said high efficiency particle arresting filter and said charcoal filter being removably mounted in a filter housing mounted on said inlet tube, said charcoal filter being positioned between said inner end of said inlet tube and said high efficiency particle arresting filter for prolonging life of said charcoal filter.

2. The system of claim 1, wherein said inlet tube has a heat exchanger in communication with heating and cooling systems of said vehicle, said heat exchanger being for heating and cooling said fresh air passing through said inlet tube.

3. The system of claim 1, wherein said inner end of said inlet tube has a directional vent for directing airflow in a desired direction.

4. The system of claim 1, further comprising a control panel in electrical communication with said inlet and exhaust fans, said control panel having at least a first controller for controlling a speed of one of said fans.

5. The system of claim 2, further comprising a control panel having a second controller in communication with said heating and cooling systems of said vehicle for adjusting the amount of heat said heat exchanger adds or removes from said fresh air passing through said inlet tube.

6. The system of claim 1, wherein said control panel has an indicator light for indicating when said filters require replacement.

7. A ventilation and filtering system for vehicles for filtering and circulating air through a vehicle, the system comprising:

an inlet tube having an outer end in communication with air outside a vehicle, an inner end positioned in a passenger compartment of said vehicle, and an intake fan for blowing air through said inlet tube into said passenger compartment of said vehicle;

an exhaust tube having a first end positioned in a passenger compartment of said vehicle, a second end in communication with air outside said vehicle, and an exhaust fan for blowing air through said exhaust tube out of said passenger compartment of said vehicle;

a high efficiency particle arresting filter mounted on said inlet tube for removing airborne debris and particles from air moving through said inlet tube, a charcoal filter mounted on said inlet tube being for removing noxious gasses and exhaust from the air moving through said inlet tube, said high efficiency particle arresting filter and said charcoal filter being removably mounted in a filter housing mounted on said inlet tube, said charcoal filter being positioned between said inner end of said inlet tube and said high efficiency particle arresting filter for prolonging life of said charcoal filter;

wherein said inlet tube has a heat exchanger in communication with heating and cooling systems of said vehicle, said heat exchanger being for heating and cooling said fresh air passing through said inlet tube;

said inner end of said inlet tube having a directional vent for directing airflow in a desired direction, wherein said directional vent includes a louver;

a control panel in electrical communication with said inlet and exhaust fans, said control panel having a first controller for controlling speeds of said fans;

said control panel having a second controller in communication with said heating and cooling systems of said vehicle for adjusting the amount of heat said heat exchanger adds or removes from said fresh air passing through said inlet tube; and said control panel having an indicator light for indicating when said filters require replacement.

\* \* \* \* \*